Aug. 15, 1939.  B. F. SCHMIDT  2,169,617

ELECTRIC MOTOR

Filed Jan. 7, 1938

Inventor
Benjamin F. Schmidt:
By R. S. Berry
Attorney

Patented Aug. 15, 1939

2,169,617

UNITED STATES PATENT OFFICE 2,169,617

ELECTRIC MOTOR

Benjamin F. Schmidt, Los Angeles, Calif.

Application January 7, 1938, Serial No. 183,807

6 Claims. (Cl. 171—252)

This invention relates to an electric motor and more particularly pertains to the laminations thereof.

An object of the invention is to provide a construction in a motor lamination of the character constituting a multi-polar field magnet whereby a motor of given capacity may be formed of smaller diameters than is possible with the lamination structures now generally in use, and whereby an electric motor may be constructed of such diameter that it may be readily introduced into and passed through well casings and well bores of small diameters to occupy a submerged position in a well and yet be of sufficient capacity to effect the operation of adequate pumping mechanism, the invention being especially applicable for use in connection with the pumping mechanism set forth in my co-pending application for Letters Patent, Serial No. 170,813, filed October 25, 1937.

Another object is to provide a construction in the motor laminations whereby, while effecting reduction of the external diameter of the assembled laminated body, such may be accomplished without necessity of reduction of the internal diameter of the laminated body and consequent reduction of the armature, and yet maintain an ample body of metal in the laminated body as to conform to present accepted practice in motor construction in minimizing creation of objectionable eddy currents and also minimize heating of the motor during operation thereof.

A further object is to provide a construction in a sheet metal stamping for use in assembling a laminated field magnet in an electric motor, which stamping embodies an annulus and a series of radial teeth projecting from one of the margins of the annulus, in which the annulus is so formed as to afford a substantial width of sheet metal at the base of the teeth and yet permit of reduction of the diameter of the motor body in comparison with the diameters of the bodies of motors of given capacities as now generally constructed.

With the foregoing objects in view, together with such other objects and advantages as may subsequently appear, the invention is carried into effect as illustrated by way of example in the accompanying drawing in which.

Figure 1:
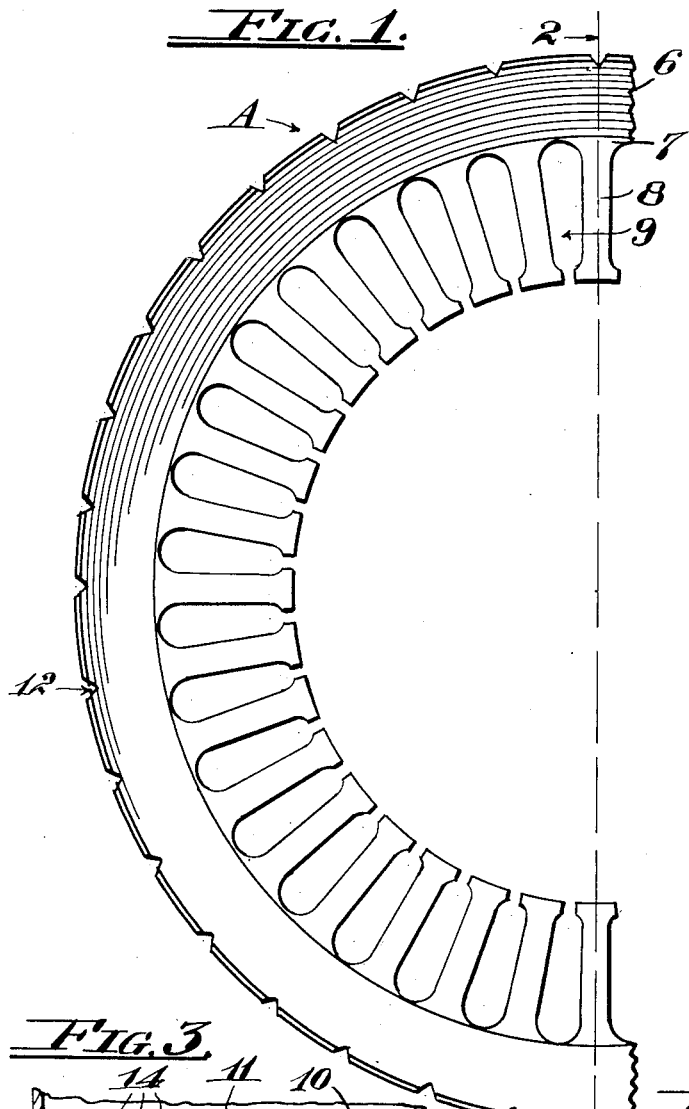
Fig. 1 is a view in elevation of a fragmentary portion of the lamination as formed for use in the construction of a stator.
Figure 2:
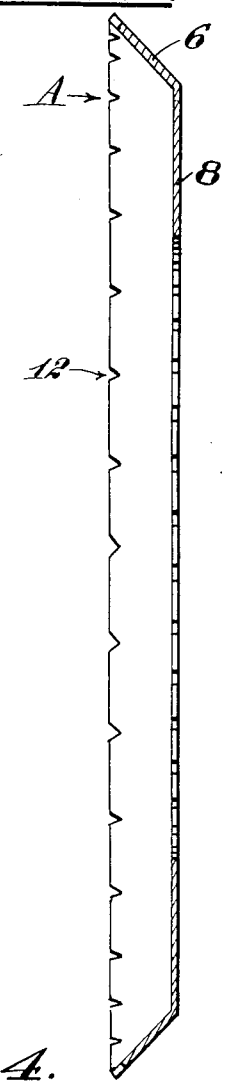
Fig. 2 is a view in cross section of the lamination as seen on the line 2—2 of Fig. 1.

Referring to the drawing more specifically A indicates generally a motor lamination as formed in carrying out the invention and which lamination embodies a stamped metallic annulus formed of flat sheet metal and having its outer marginal portion 6 extending at an incline relative to its inner peripherial portion 7 in frusto-conical form thus imparting to the lamination a dished formation such that a series of the laminations may be assembled in the form of a cylinder with adjacent laminations nested and centralized relative to each other; the inner portion 7 of the annulus being formed with the usual arrangement of inwardly projecting teeth 8 separated by spaces 9 for the reception of the usual field coil windings 10 as commonly employed in the formation of multipolar field magnets in electric motor constructions.

As generally practiced in motor construction a series of the laminations A are assembled face to face and insulated apart by the oxide coating formed on the surfaces of the metal of which they are formed, and the coil windings 10 are wound through the spaces 9 around the teeth 8 in conventional fashion.

The essence of the invention resides in the formation of the laminations A with the angularly extending marginal portion 6 projecting from the marginal portion 7 at a point adjacent the base portions of the teeth 8, whereby the teeth are arranged to project from the peripherial margin of a frusto-conical annulus with the teeth of the laminations lying on a plane extending at right angles to the axis of the annulus. By this construction the outer margins of the laminations are contracted inwardly toward the axis of the motor body in such manner as to effect reduction of the external diameter of the motor as compared with the usual motor construction in which the laminations are flat throughout. Furthermore by the provision of the angular marginal portion of the lamination, the width or surface area thereof may be that required to form the body of assembled laminations with ample metallic wall thickness to minimize eddy currents and overheating of the motor and yet attain the requisite reduction of the external diameter of the motor without reduction of the diameter of the armature which of course would result in decrease in the capacity of the motor.

Figure 3:
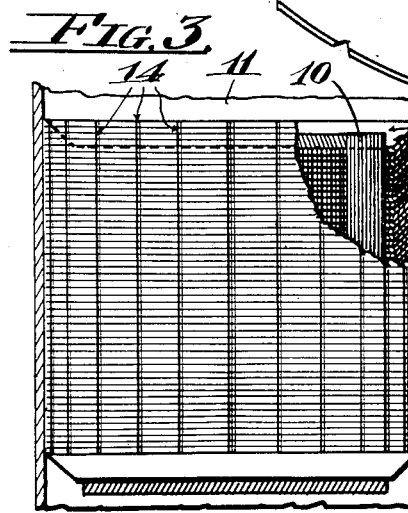
Fig. 3 is a view in elevation of a stator formed of the laminations shown in Fig. 1 with portions broken away to depict a part thereof in section and showing the manner of assembling the laminations thereof.

A stator assembled of the laminations A is designed to be encased in a housing containing oil, the shell 11 of which housing closely conforms to the outer periphery of the stator. In order to permit intercommunication between the ends of the stator along the exterior thereof, the laminations A are formed on the outer margin of the wall 6 with a series of notches 12 which are arranged to register with complementary notches on an adjacent lamination whereby when the motor cylinder is assembled a series of longitudinally extending grooves will be formed on its outer periphery as indicated at 14 in Fig. 3 and which grooves constitute passages through which oil may pass from one end of the stator to the other along the inner periphery of the shell. The notches 12 thus serve in conjunction with the angular formation of the stator laminations as a means for affording reduction of the external diameter of the motor since the housing shell 11 may be formed to snugly fit the outer periphery of the stator.

While the laminations A are especially suitable for use in the construction of stators or stationary external field magnets, it will be understood that a similar construction may be employed in the formation of laminations for internal rotary field magnets by forming the laminations with a frusto-conical annulus 16 on the enlarged outer margin 17 of which is formed the radial teeth 18 separated by openings 19 through which the field windings are passed.

Figure 4:
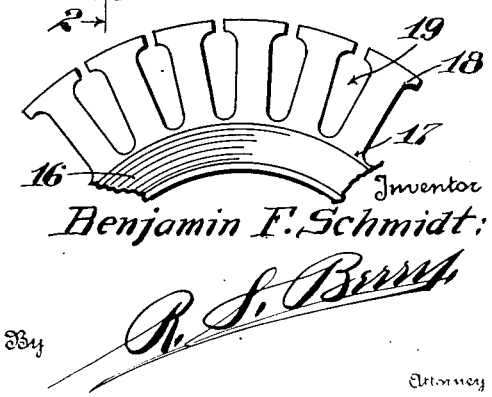
Fig. 4 is a plan view of a fragmentary portion of a lamination as formed when employed in the construction of a rotary field magnet.

It will be seen from the foregoing that the laminations A are characterized by having a marginal portion, either external as shown in Fig. 1, or internal as shown in Fig. 4, which is in the form of a truncated cone, from one end of which extends a series of radial teeth projecting perpendicular to the axis of the cone and forming open ended slots extending in radial relation to each other and the other end of which constitutes a margin of the lamination.

The invention is especially applicable for use in the construction of electric motors which are designed to be lowered in well bores or casings to effect operation of pumping mechanism as set forth in the application aforesaid in which the motor as well as the pumping mechanism is submerged in the liquid in the well but with the motor encased in oil contained in a housing which latter must necessarily have an external diameter less than the internal diameter of the well bore or casing into which it is lowered.

For example, I have found that in a standard sized well casing of four and one-half inches inside diameter, which is ordinarily employed at considerable depths in oil wells, a standard motor stator of such size as to accomplish the work necessary for effecting operation of a pumping mechanism with practical efficiency at such depths is of an external diameter as to preclude its use in the small space afforded in such casing. By my improved construction I am able to effect a reduction of at least five-sixteenths of an inch in the motor diameter which is sufficient to enable the production of a motor of ample capacity for such small sized well casings. Manifestly I am able to effect reduction in the diameters of motors to be used in well casings of larger diameters by employment of the stator construction herein set forth, and to attain a reduction in diameter of any standard motor of given capacity.

It will be noted that by the construction shown, the motor stator as well as the housing encompassing same may be cylindrical in form and free of external projections and the stator and housing snugly fitted together.

I claim:

1. In an electric motor, a cylindrical body formed of a series of sheet metal annular elements having a marginal portion of frusto-conical form and having radial teeth projecting from an end thereof in angular relation thereto, said elements being disposed in nested relation to each other, field windings surrounding the assembled teeth, and a cylindrical housing encompassing said stator body in close contact therewith; said annular elements having notches formed in the margins of the enlarged ends thereof and being arranged with the notches of adjacent elements in register with each other to form longitudinal passages in the stator body leading from end to end thereof.

2. In an electric motor, a cylindrical stator body formed of a series of sheet metal annular elements having outer marginal portions of frusto-conical form and having teeth projecting inwardly from the margin of the reduced inner end thereof; the enlarged outer ends of said elements being formed with notches; said elements being disposed in nested arrangement relative to each other with the notches and teeth of adjacent elements positioned in alignment with each other.

3. In an electric motor, a stator element comprising a sheet metal annulus of frusto-conical form having a series of radially extending teeth on one margin thereof extending on a plane perpendicular to the axis of the annulus.

4. In an electric motor, a stator element comprising a sheet metal annulus of frusto-conical form having a series of inwardly extending teeth on its reduced inner margin extending on a plane perpendicular to the axis of the annulus.

5. In a lamination for electric motors, a thin annular metal structure having a flat portion formed with a plurality of open ended slots arranged in radial relation to each other and a frusto-conical marginal portion directly connected to and supporting said slotted portion for the purpose of decreasing the external diameter of said lamination and affording a substantial width of the metal supporting said slotted portion of the lamination within a limited diameter.

6. In a motor, a plurality of thin annular metal stampings arranged in operative relation to each other and having marginal slots for receiving electric elements, there being a continuation of metal from said slots at an angle thereto for the purpose of decreasing the diameter of the motor; said continuation being in the form of a truncated cone and terminating at the end thereof opposite said marginal slots.

BENJAMIN F. SCHMIDT.